Apr. 17, 1923.  
E. A. SPERRY, JR  
1,452,483  
HORIZONTAL BEARING FOR GYROSCOPES  
Filed Oct. 12, 1916

INVENTOR  
ELMER A. SPERRY, JR.  
BY  
Herbert H. Thompson  
ATTORNEY.

Patented Apr. 17, 1923.

1,452,483

UNITED STATES PATENT OFFICE.

ELMER A. SPERRY, JR., OF BROOKLYN, NEW YORK.

HORIZONTAL BEARING FOR GYROSCOPES.

Application filed October 12, 1916. Serial No. 125,169.

*To all whom it may concern:*

Be it known that I, ELMER A. SPERRY, Jr., a citizen of the United States of America, residing at 1505 Albermarle Road, Brooklyn, in the county of Kings and State of New York, have invented certain new and useful Improvements in Horizontal Bearings for Gyroscopes, of which the following is a specification.

This invention relates to steering gyroscopes for torpedoes and other gyroscopic apparatus which is supported for oscillation about a horizontal axis and its main object is to improve upon existing methods of supporting such gyroscopes about their horizontal axes.

While considerable attention has been given in this art to eliminating friction about the vertical axis of the gyroscope, prior workers in the art have not appreciated the importance of eliminating all friction about the horizontal axis.

I find, however, that it is, if anything, more important to eliminate friction about the horizontal axis of support than about the vertical, since, if the torpedo should pitch, or turn from an inclined to a horizontal running position, a torque would be exerted about the horizontal axis of support, unless such support were frictionless, which would cause precession of the gyroscope about its vertical axis and an immediate and permanent deviation of the torpedo from its course. Both ball bearings and plain bearings have been used as a means of support about said horizontal axis, but I find both types unsuited to my purpose, since, although, ball bearings will run with little friction at high speeds they are liable to stick when turned through a small angle from a position of rest. The same is true regarding plain bearings to an even greater extent. According to my invention I employ a special form of knife edge support for said horizontal axis, whereby friction is reduced to a minimum.

Referring to the drawings in which, what I now consider to be the preferred form of my invention is shown, Fig. 1 is a section of a small portion of the torpedo with the steering gyroscope therein contained.

Figure 1:
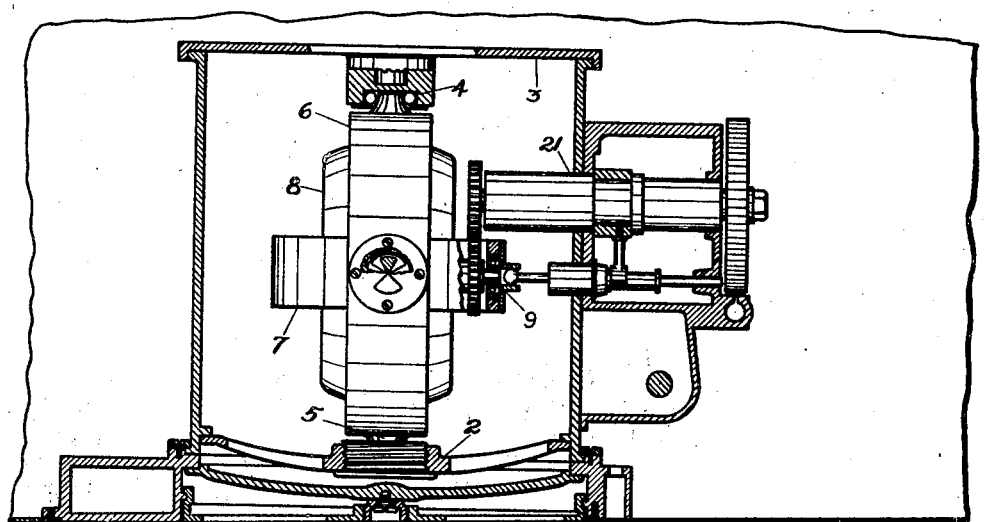
Figure 2:
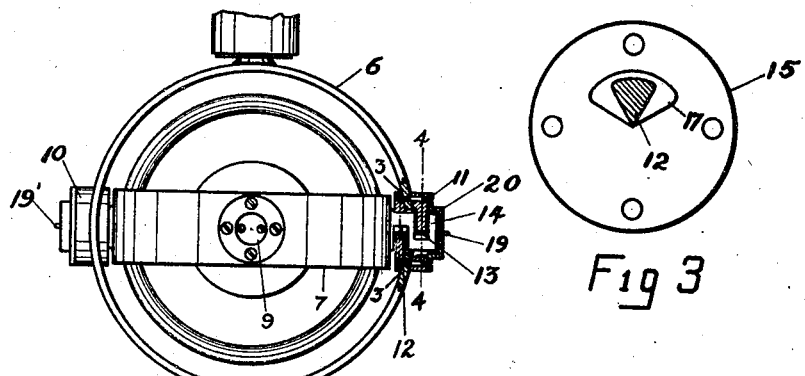
Fig. 2 is an elevation of the gyroscope partly in section, at right angles to the position shown in Fig. 1.
Figure 3:
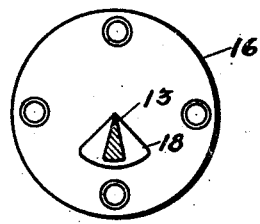
Fig. 3 is a view of one of the bearing plates, being a section taken approximately on line 3—3 of Fig. 2.
Figure 4:
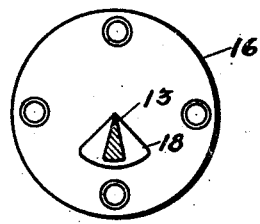
Fig. 4 is a view of another of the bearing plates taken approximately on line 4—4, Fig. 2.

The torpedo shell is represented at 1, within which the detachable gyroscopic unit 2 is supported in the usual manner. The gyroscope is shown as provided with the usual spinning up and locking mechanism 21, which, it will be understood, is withdrawn upon the launching of the torpedo. The frame 3 of the gyroscope contains the usual vertical bearings 4 and 5, within which is rotatably supported the vertical ring 6 of the gyroscope or a member equivalent thereto. Within said vertical ring upon a normally horizontal axis is supported the rotor bearing frame 7, within which the rotor 8 is mounted on horizontal spinning axis 9 at right angles to said other horizontal axis.

The bearing frame 7, which in this instance is shown as a ring, is pivotally connected to ring 6 by means of knife edge bearings 10 and 11. Preferably one or both of these bearings is made with a plurality of oppositely pointed knife-edges with corresponding bearing plates therefor so that sudden movements of the torpedo will neither throw the knife-edges off of the bearing plates, nor cause friction. The knife-edges 12 and 13 are shown as attached to, or forming a part of a projecting arm 14 on ring 7. Knife 12 points downwardly and serves to support the weight of the gyroscope. Knife 13 on the other hand is oppositely pointed and holds knife-edge 12 in place.

The bearing plates 15 and 16 for the two knife-edges are secured to ring 6 and are provided with cut away portions 17 and 18 within which the knife-edges rest. The knife 13 may be more tapering than knife 12, since it supports no weight.

In order to take up end play, I may also provide small pins 19, 19' secured in a plate 20 and bearing against the ends of projections 14, in line with the knife edges.

The bearings above described, if carefully ground, operate with far less friction than the existing types and are unaffected by jolts and jars. With them the deviations of torpedoes, especially of the type that are launched at an angle, have been markedly reduced.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means.

Having described my invention, what I claim and desire to secure by Letters Patent is:

1. In combination, a gyroscope comprising a rotor, a rotor bearing frame, a supporting ring, and a bearing including an upwardly pointed knife edge carried by said frame for supporting the frame in said ring.

2. In combination, a gyroscope comprising a rotor, a rotor bearing frame, a vertical ring, and a normally horizontal knife edge bearing for supporting the frame from said ring, including oppositely pointed knife edges and bearing plates therefor.

3. In combination, a gyroscope comprising a rotor, a rotor bearing frame, a downwardly and an upwardly pointed knife edge thereon, and bearing plates for said knife edges.

4. In combination, a gyroscope comprising a rotor, a rotor bearing frame, a supporting ring, and differently pointed knife edges and bearing plates therefor for supporting the frame from said ring.

5. In combination, a gyroscopic rotor, a bearing frame therefor, a supporting member for said frame and means comprising a knife edge bearing and a cooperating bearing member for preventing upward displacement of said frame with respect to said member.

6. In combination, a gyroscopic rotor, a bearing frame therefor, a supporting member and means comprising a plurality of angularly disposed wedge-shaped elements associated with each of opposite sides of said frame pivotally connecting said frame and member.

7. In combination, a gyroscopic rotor, a bearing frame therefor, a supporting member and means comprising a plurality of oppositely pointing elements pivotally connecting said frame and member for preventing displacement of said frame relative to said member in correspondingly opposite directions.

8. In combination, a gyroscopic rotor, a bearing frame therefor, a supporting member and means comprising a plurality of oppositely pointing wedge-shaped elements pivotally connecting said frame and member for preventing displacement of said frame relative to said member in correspondingly opposite directions.

9. In combination, a gyroscopic rotor, a frame in which said rotor is rotatably mounted, a supporting member and a bearing between said frame and member, said bearing comprising a plurality of angularly disposed pointed elements having their apices substantially on the pivotal line of said bearing.

In testimony whereof I have affixed my signature.

ELMER A. SPERRY, Jr.